United States Patent [19]

Ladouceur

[11] Patent Number: 5,239,740
[45] Date of Patent: Aug. 31, 1993

[54] METHOD OF INSTALLING SEALING FASTENER

[75] Inventor: Harold A. Ladouceur, Livonia, Mich.

[73] Assignee: Multifastener Corporation, Detroit, Mich.

[21] Appl. No.: 954,202

[22] Filed: Sep. 30, 1992

Related U.S. Application Data

[63] Continuation of Ser. No. 693,892, May 1, 1991.

[51] Int. Cl.⁵ .............................................. B23P 11/00
[52] U.S. Cl. ..................................... 29/432.2; 29/432; 29/525.1; 29/798
[58] Field of Search ................... 29/432, 432.1, 432.2, 29/798, 525, 525.1; 411/179

[56] References Cited

U.S. PATENT DOCUMENTS

| | | | |
|---|---|---|---|
| 2,750,660 | 6/1956 | Newcomb | 29/432 |
| 2,799,188 | 7/1957 | Newcomb | 29/432 X |
| 3,108,368 | 10/1963 | Steward | 29/798 X |
| 3,299,500 | 1/1967 | Double | 411/179 X |
| 3,439,723 | 4/1969 | Double et al. | 411/179 |
| 3,506,050 | 4/1970 | Pouch et al. | 29/432 X |
| 3,648,747 | 3/1972 | Steward | 411/179 |
| 3,810,291 | 5/1974 | Ladouceur | 29/432 X |
| 3,811,171 | 5/1974 | Grube | 29/798 X |
| 3,878,599 | 4/1975 | Ladouceur et al. | 411/179 X |
| 3,969,808 | 7/1976 | Goodsmith et al. | 29/798 |
| 4,064,617 | 12/1977 | Oaks | 29/798 X |
| 4,630,363 | 12/1986 | Woods | 29/798 |
| 4,911,592 | 3/1990 | Muller | 29/432.2 X |
| 4,940,375 | 7/1990 | Marvell et al. | 29/432.2 X |

Primary Examiner—Timothy V. Eley
Assistant Examiner—C. Richard Martin
Attorney, Agent, or Firm—Howard & Howard

[57] ABSTRACT

A die member for joining a fastener to a panel includes a generally rectangular opening defined by two spaced apart opposed end walls, which receive the end walls of a pilot portion of a fastener. The end walls of the opening terminate into arcuate corners and are adapted to sheer and deform the pilot end walls of the fastener thereby forming bearing panel support abutments capable of providing a liquid tight seal between the panel and the fastener. The die member also includes clinching lips on opposed sides of the die opening. The clinching lips preferably include a top portion and tapered wall which deform the panel edges into grooved openings in the fastener thereby providing a liquid tight seal. The die opening is surrounded by a generally planar surface having an outer generally rectangular perimeter having generally arcuate corners. The generally arcuate corners form arcuate depressions within the panel when the die member operates on the fastener to attach it to the panel. The arcuate depressions resist stress fracturing of the panel when the panel and fastener assembly is subjected to high vibrational environments.

4 Claims, 3 Drawing Sheets

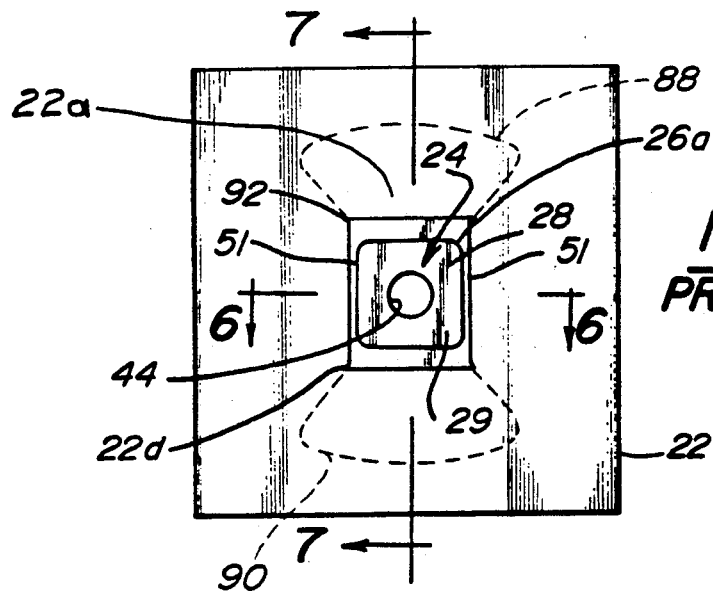
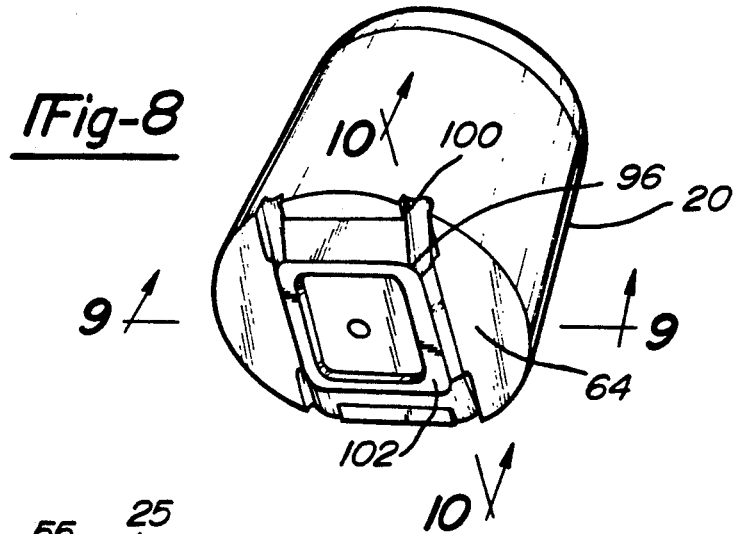
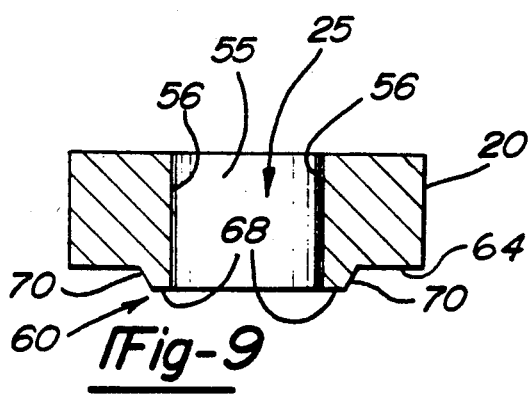
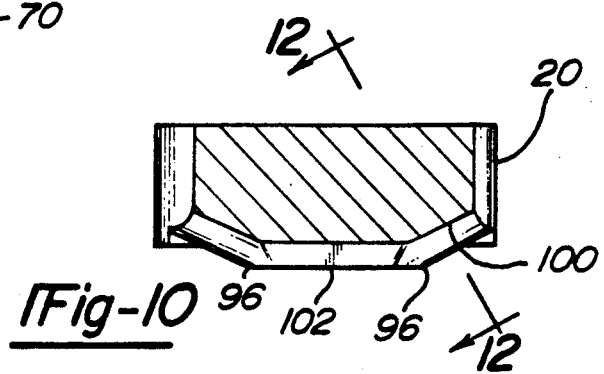

METHOD OF INSTALLING SEALING FASTENER

RELATED APPLICATIONS

This application is a continuation application of U.S. patent application Ser. No. 07/693,892 filed May 1, 1991.

TECHNICAL FIELD

The present invention generally relates to an apparatus for performing a low pressure fluid seal between a fastener and a panel, and more particularly relates to an improved die member for effecting a fluid-type seal between a fastener and a panel wherein the panel is resistant against cracking and other fatigue induced failures.

BACKGROUND OF THE INVENTION

Pierce and clinch fasteners of the type disclosed herein have been commercially successful, particularly in conjunction with the automobile industry. For example, U.S. Pat. No. 3,648,747 discloses the general configuration of a fastener and panel assembly similar to that of the present invention. As disclosed in the '747 patent, the fastener (nut) includes a rectangular pilot portion, a panel bearing flange portion on opposite sides of the nut, and reentrant grooves in the flange portions, adjacent the pilot. The nut is flush mounted on a panel by piercing the panel with the nut pilot and deforming the pierced panel edges into the reentrant grooves, preferably without slitting the panel of the outer groove walls. The resultant nut and panel assembly has substantially improved push-out and pull-through strength, as compared with the prior art.

Pierce nuts of this general configuration have also been used to form nut and panel assemblies, wherein the pierce nut pilot is deformed on the nonflanged ends, beneath the panel, to form additional panel bearing abutments, however the panel was simultaneously slot or severed at the outer groove walls when the panel was deformed into reentrant grooves (see for example U.S. Pat. No. 3,439,723). Corner clinching of the nut pilot has also been used commercially to increase the strength of the nut and panel assembly, including pierce nuts of the general configuration disclosed herein (see U.S. Pat. Nos. 2,750,660 and 2,799,188).

Certain nut and panel assembly applications require a low pressure fluid seal between the nut and the panel assembly. For example, in certain automotive applications, water or other fluid must be prevented from seeping through the interface between the nut and the panel to prevent rust from developing or to protect various items from water damage. Generally, automotive specifications require that the seal be capable of containing the fluid and preventing seepage as described herein. Such a low pressure fluid seal between the nut and panel assembly is disclosed in U.S. Pat. No. 4,630,363. The five above-referenced patents are assigned to the assignee of the present application and the disclosure of all such patents are hereby incorporated by reference.

Although the sealed nut and panel assembly apparatus set out in the above-mentioned '363 patent is effective for preventing the transfer of fluid through the nut/panel interface, it was found that in some applications, especially those wherein the nut/panel assembly was subjected to high levels of vibrations, the panel was prone to develop stress cracks or otherwise fail due to general fatigue.

Thus, it is an object of this invention to provide an improved die member for use in fabricating fastener/panel assemblies which are resistant to failure due to stress cracking.

SUMMARY OF THE INVENTION

The apparatus of this invention, for forming a fastener in a sealed relation to a panel, preferably includes a die member for joining a fastener to a panel, the fastener is preferably of the type having an insertion face including a generally rectangular pilot having a top face, the top face of the pilot is bounded by at least two opposing end walls, the fastener further including flange portions on opposed sides of the pilot, each flange portion having bearing surfaces lying in a plane spaced apart from the pilot top face, each flange portion including a groove in its bearing surface and each groove having an inner side wall, outer side wall and a bottom wall extending between the inner and outer side walls, the inner side wall being disposed proximate to the pilot and the outer side wall being disposed distal to the pilot. The die member preferably includes a die body having a generally rectangular opening adapted to intimately engage the pilot portion of the fastener, the opening defined by at least two opposing end walls and two opposing side walls, the generally rectangular opening having generally arcuate corners and the width between the opposed end walls of the die member being less than the width of the fastener pilot between the two opposing end walls of the pilot. The generally rectangular opening of the die body is surrounded by a generally planar surface having an outer perimeter defined by a rectangle having generally arcuate corners. The die body is effective for joining the fastener to the panel, whereby, when the panel is disposed between the fastener and the die body, and the fastener insertion face is passed through a panel opening and brought into operative engagement with the generally rectangular opening of the die body, the portion of the rectangular opening defined by the opposing end walls and the arcuate corners is operative for deforming, generally parallel to the plane of the flange bearing surfaces, an edge portion of the pilot near the pilot end walls thereby forming a panel bearing surface on the pilot. The panel bearing surface generally extends across the width of the fastener end walls and into the grooves. The panel is supported upon the pilot bearing surface in a sealed relationship thereto. The die body further includes upstanding elongated clinching lips located along opposing sides of the generally rectangular opening, the clinching lips having a flat top portion and tapered side walls, including tapered inner side walls for engaging a portion of the panel proximate to the panel opening and deforming the portion of the panel proximate to the panel opening into the grooves and against the inner side walls of the grooves thereby forming a sealed relationship, whereby the panel is in sealed engagement with the fastener grooves and the bearing surfaces of the fastener pilot. This relationship provides a continuous low pressure seal between the fastener and the seal panel. The die body is also effective for creating a fastener and panel assembly which is resistant against fatigue cracking wherein, when the fastener is brought into operative engagement with the generally rectangular opening of the die member, the generally planar surface surrounding the opening is depressed into the panel whereby the arcuate corners of the generally planar surface engage the panel thereby causing arcuate depressions in said panel. The arcuate depressions being effective for resisting panel cracking due to fatigue.

Other advantages and meritorious features of the present invention will become more fully understood from the following description of the preferred embodiments, the appended claims and the drawings, a brief description of which follows.

BRIEF DESCRIPTION OF THE DRAWINGS

FIG. 5 is a bottom view of the prior art embodiment of the fastener and panel assembly formed by the prior art die member shown in FIGS. 1-4.

FIG. 8 is the preferred embodiment of the die member of the present invention.

FIG. 9 is a cross-sectional view of the die member of the present invention taken substantially along lines 9—9 of FIG. 10 is a cross-sectional view of the die member of the present invention taken substantially along lines 10—10 of FIG. 8.

DESCRIPTION OF THE EMBODIMENTS AND METHOD OF THE PRIOR ART

Figure 1:
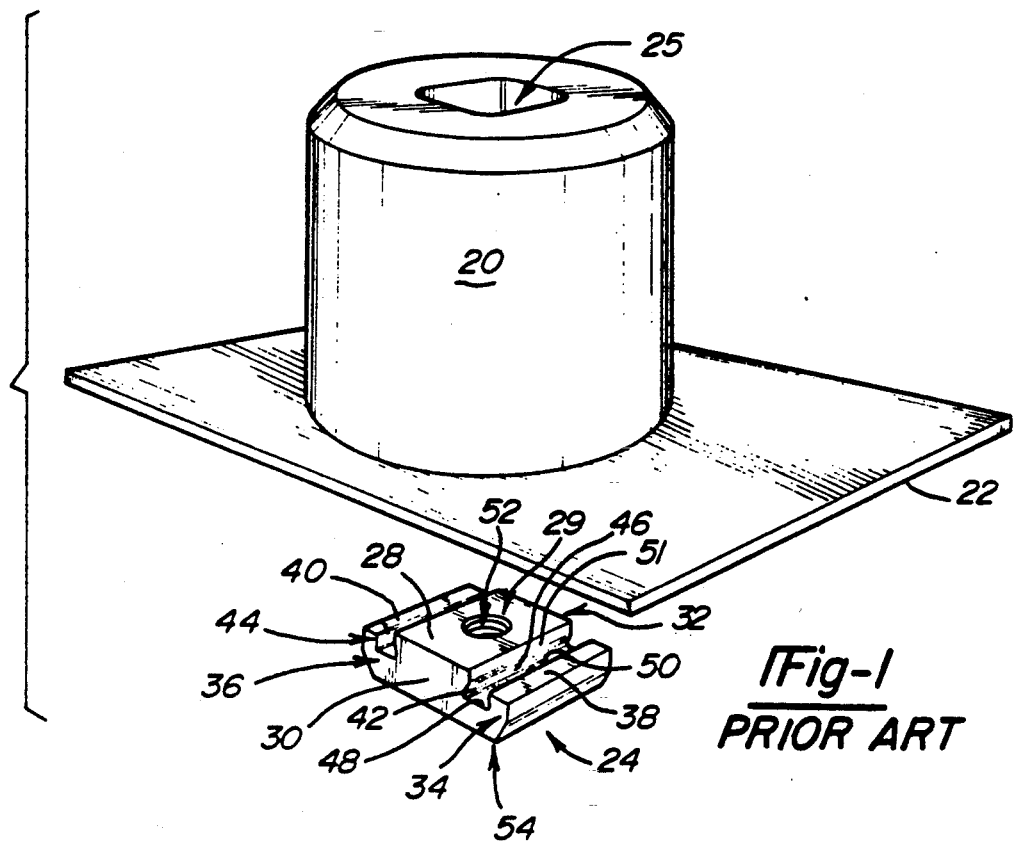
FIG. 1 is an exploded, perspective, view of the prior art showing a die member, panel and fastener wherein the fastener is ready for installation in the panel by the die member.

FIG. 1 shows fastener 24 of the prior art which may include a pierced-type fastener or a fastener which is adapted to be installed into a pre-pierced panel hole. Likewise, fastener 24 may be a nut-type fastener (as shown in FIG. 1) or may also be any other type of fastener such as a threaded stud-type, or the like. Accordingly, it is to be understood that the term fastener, whenever used in this specification, is meant to include the nut-type fastener shown in FIG. 1, along with any other type of fastener.

Pierce nut 24 is of the type utilized to form a low pressure fluid seal against panel 22. Die body 20 is used in accomplished this sealed relationship between fastener 24 and panel 22. Pierce nut 24 includes a central rectangular pilot portion 29 having a flat (or top piercing or insertion face) 28 and end walls 30, 32. Walls 30, 32 generally bound face 28 at two of its ends, and are generally perpendicular to face 28. Pierce nut 24 also includes integral flange portions 34, 36 located on opposite sides of pilot 29. Flange portions 34, 36 include respectively associated panel bearing faces 38, 40 spaced below the plane of top insertion face 28 of pilot 29. Panel bearing faces 38, 40 include respectively associated grooves 42, 44. Grooves 42, 44 extend generally perpendicular to end walls 30, 32 of fastener 24.

It will be understood that "top" and "bottom" are relative terms and are used herein for purposes of description only. Further, pierce nut 24, panel 22 and die body 20 are arranged in the drawings to illustrate the method of performing the nut and panel assembly of the present invention. In actual use, die body 20 will generally be the lower or bottom element in the assembly and pierce nut 24 will be moved downwardly by a pierce nut installation head to form the nut and panel assembly. As disclosed in the above reference United States patents assigned to the assignee of the present application, a pierce nut is generally installed by a pierce nut installation head in a die press assembly. The panel may be simultaneously formed in the die press, particularly in automotive applications, and several pierce nuts may be simultaneously installed in the panel. FIG. 1, however, illustrates a commercial application, regardless of whether pierce nut 24 is located above or below die body 20, with panel 22 located therebetween.

Parallel grooves 42, 44 each include an inner side wall 46, a bottom wall 48 and an outer side wall 50. In the prior art embodiment, and the preferred embodiment of fastener 24, grooves 42, 44 are re-entrant, wherein one or both of inner and outer side walls 46, 50, respectively, are inclined toward their respectively associated panel bearing surface 38, 40 to form a restricted groove opening. The reentrant grooves are effective for entrapping the panel metal deformed into the grooves thereby substantially improving nut retention, as described in the above-referenced U.S. Pat. No. 3,648,747.

Fastener 24 includes central threaded bore 52 having an axis generally perpendicular to top insertion face 28 of pilot 29. Of course it is understood that bore 52 may be left unthreaded and a self-threading bolt or the like may be used therein. Pilot 29 also includes pilot side walls 51 generally perpendicular to top insertion face 28 of pilot 29. Bottom face 54 of fastener 24 is preferably flat and generally parallel to top face 28 of pilot 29. As described in the above-reference patents of the assignee, bottom face 54 is engaged by a plunger of an installation apparatus or head, not shown, to form the nut and panel assembly (see also U.S. Pat. Nos. 3,108,368 and 3,969,808 which disclose suitable installation heads which may be utilized to form the nut and panel assembly shown in the present application). Both of the above-referenced patents are assigned to the assignee of the present application and are hereby incorporated by reference.

Figure 2:
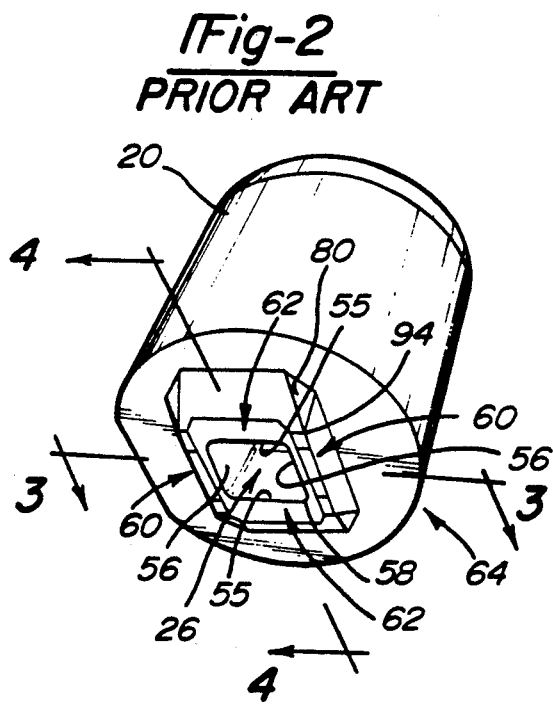
FIG. 2 is a perspective view of the prior art die member.
Figure 3:
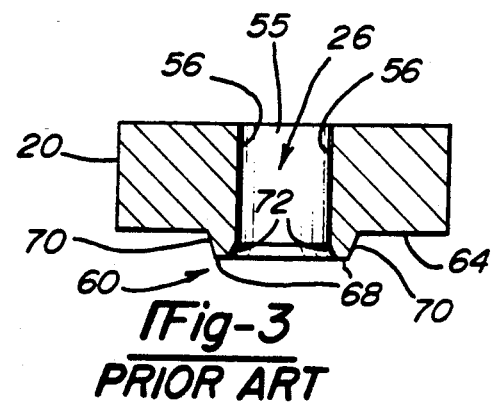
FIG. 3 is a cross-sectional view taken substantially through lines 3—3 of the prior art die member of FIG. 2.
Figure 4:
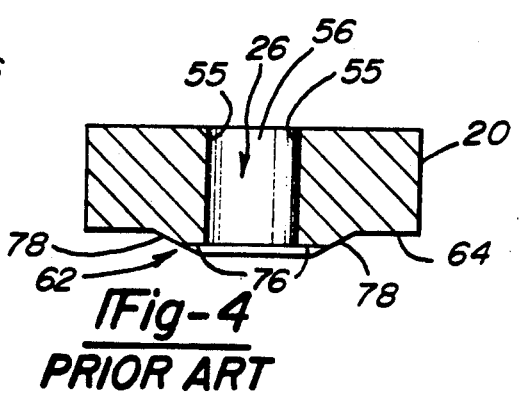
FIG. 4 is a cross-sectional view taken substantially along lines 4—4 of the prior art die member of FIG. 2.

Die body 20, which is shown in more detail in FIGS. 2-4, includes a central, generally rectangular passageway 25 having opposed end walls 55 and opposed side walls 56. Opposed end walls 55 arcuately blend into opposed side walls 56 and generally define opening 26 in the working face 64 of die body 20. Opening 26 generally resembles a rectangle having arcuate corners 58. Upstanding clinching lips 60 are provided on opposed sides of opening 26 adjacent internal side walls 56, and upstanding spanking lips 62 are provided adjacent internal end walls 55 of opening 26. As shown in FIGS. 3 and 4, clinching lips 60 and spanking lips 62 extend from generally flat end face 64 of die body 20. It is to be understood that the external configuration of die body 20, which is cylindrical in the disclosed embodiments, is a matter of design choice.

Clinching lips 60, best shown in FIG. 3, each include a flat top or end face 68, an outwardly tapering or truncated outer wall 70 and an inwardly tapering or truncated inner wall 72. Inner walls 72 of clinching lips 60 terminate in side walls 56 of die opening 26. Spanking lips 62, best shown in FIG. 4, each include flat top or end face 76 and an outwardly tapering or truncated outer wall 78. It will be noted from FIGS. 2 and 4, that clinching lips 60 extend further from the plane of end face 64 of die 20 than do spanking lips 62. As best shown in FIG. 2, clinching lips 60 and spanking lips 62 join to form an enclosure around opening 26 of die body 20. Corners (exemplified at 80) at the junction of clinching and spanking lips 60, 62 are preferably truncated and the various edges are preferably rounded to avoid splitting panel 22 during installation of nut 24, which is described below. Preferably, tapered outer side walls 70 of clinching lips 60 are defined at a steep angle than outer tapered side walls 78 of spanking lips 62. The prior art method of forming a nut and panel assembly will now be described in conjunction with FIGS. 6 and 7.

Figure 7:
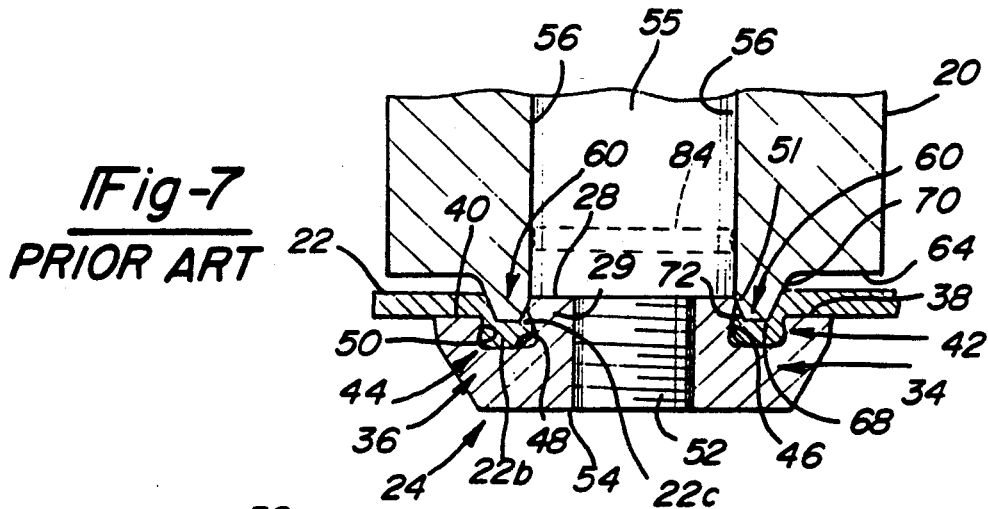
FIG. 7 is a cross-sectional view taken substantially along lines 7—7 of the prior art fastener and panel assembly of FIG. 5.
Figure 6:
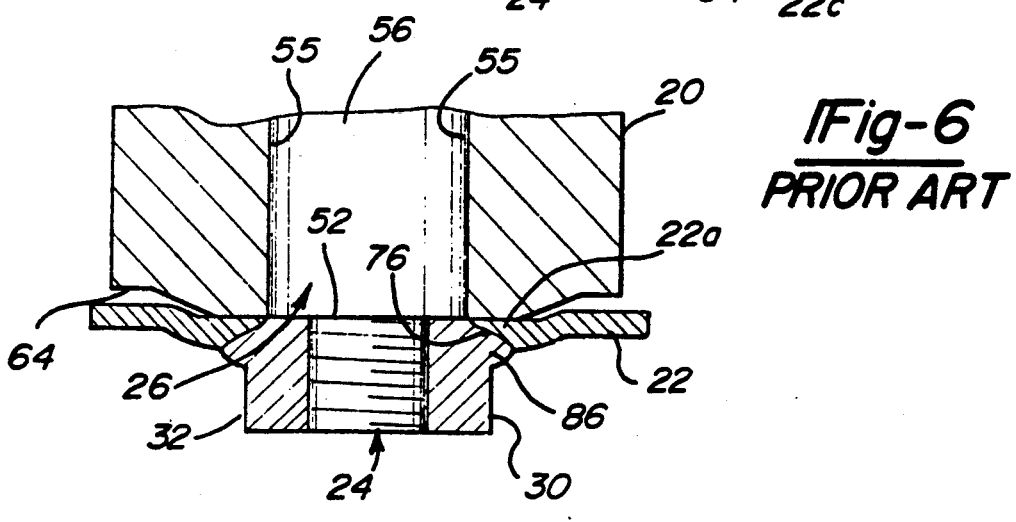
FIG. 6 is a cross-sectional view taken substantially along lines 6—6 of the prior art fastener and panel assembly of FIG. 5.

Now referring to FIGS. 6 and 7, pierce nut 24 is forced into contact with panel 22 by a pierced nut installation head or apparatus and panel 22 is supported on die body 20 (or vis-a-versa). Opposed internal end walls 54 of die opening 26 receive end walls 30, 32 of pierce nut 24 and opposed side walls 56 of die opening 26 receive side walls 51 of pilot 29. Rectangular slug 84 is pierced from panel 22 by the top, insertion face 28 of pilot 29 and pilot 29 is received through the pierced panel opening. It is important to note that although the system is described in conjunction with a self-piercing fastener, the fastener and die of the present invention could just as easily be used on a panel having a pre-pierced opening. The distance between end walls of die opening 26 is less than the width of fastener 24 as measured between pilot side walls 30, 32 of pilot 29. As shown in FIG. 6, end walls 30, 32 of fastener 24 are thus simultaneously sheared (or deformed) outwardly beneath panel 22 to form ledge abutments 86 in the end walls 30, 32 of fastener 24. The corners of pilot 29 are likewise sheared (or deformed) by arcuate corners 58 of die opening 26 to form ledge abutments 86 beneath panel 22 at the corners of nut 24 (see 26a of FIG. 5). Accordingly, it is seen that ledge abutments 86 bear against and support distal ends 22a of panel 22 adjacent pierced panel opening 26 at end walls 30, 32 and also at corners (exemplified at 26a) of the nut.

As seen in FIG. 7, panel 22 bottoms out on bearing faces 38, 40 of respective flange members 34, 36. Bearing surfaces 38, 40 and ledge abutments 86 thus provide bearing support for fastener 24 while also providing sealing contact with panel 22. The side edges of panel 22 (shown at 22b in FIG. 7) adjacent the panel opening, are simultaneously deformed into reentrant grooves 42, 44 of fastener 24 by clinching lips 60. End face 68 and tapered outer walls 70 of clinching lips 60 deform panel portion 22b (which is spaced from distal panel edges 22c) into contact with bottom walls 48 of grooves 42, 44. Distal edges 22c of panel 22, adjacent the pierced opening in panel 22, are simultaneously deformed into sealing contact with inner side wall 46 of grooves 42, 44 by way of tapered inner wall 72 of clinching lips 60. Panel 22 thus sealingly contacts both bottom walls 48 and inner side walls 46 of grooves 42, 44 thereby forming a fluid seal along two surfaces of grooves 42, 44.

As shown in FIG. 5, panel 22 is continuous around insertion face 28 of pilot 29. The portions of panel 22 adjacent side walls 51 of pilot 29 are continuous over the outer side walls 50 of grooves 42, 44 (see FIG. 7), including portions 22b of panel 22 which are deformed against bottom walls 48 of grooves 42, 44. Truncated corners 80 of die body 20 (see FIG. 2) form angled depression portion in panel 22 (exemplified at 22d) and prevent slitting of the panel at the ends of grooves 42, 44 during installation. Further, as described above, fastener 24 is in bearing engagement with panel 22 on all four sides and likewise, along the corner portions of pilot 29. The bearing supports are provided by bearing faces 38, 40 along each integral flange 34, 36 and by ledge abutments 86 formed in end walls 30, 32 of fastener 24 and top corners 26A of pilot 29. The combination of the bearing engagement between fastener 24 and panel 22 and the unique deformation of panel edges in grooves 42, 44 provide a low pressure fluid seal between fastener 24 and panel 22.

The effectiveness of the fluid seal between fastener 24 and panel 22 is tested by installing fastener 24 in panel 22 in the manner which has been described, and sealing threaded bore 52 with a bolt or plug. The assembly is then exposed to a low pressure water or other liquid and left so exposed for several hours. If no leakage occurs between the fastener and panel interface, the seal is considered sufficient for automotive applications requiring a low pressure fluid seal.

DETAILED DESCRIPTION OF THE PREFERRED EMBODIMENTS

Now referring to FIG. 5, although the prior art system is effective for accomplishing a low pressure fluid seal between a fastener and a panel, it was found that the fastener/panel assembly of the prior art tended to fracture along fracture lines 88, 90 in high vibration environments. This weakness is believed to be caused by the sharply angled depression (exemplified at 92) which are created in the surface of panel 22 by the tips 94 (see FIG. 2) of truncated corners 80. Thus the die body of the present invention was developed to eliminate tips 94. The preferred die body of the present invention will now be explained in conjunction with FIGS. 8-11.

Figure 11:
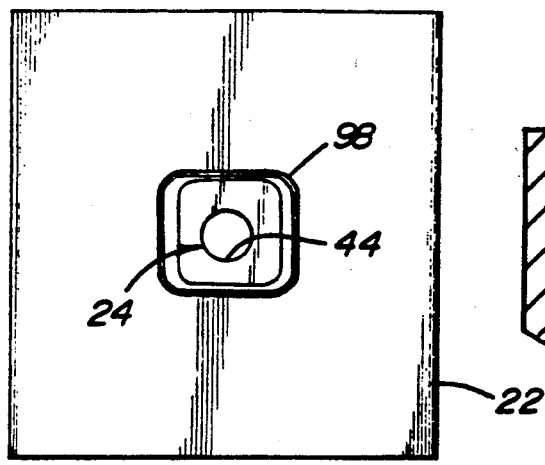
FIG. 11 is a bottom view of the preferred embodiment of the fastener and panel assembly formed by the die member of FIG. 8.

Now referring to FIG. 8, die body 20 is similar to the die body of the prior art in many respects. One major difference is seen by comparing tip 94 of corner 80 (seen in FIG. 2) to that of corner 96 of die body 20 of FIG. 8. Thus, it can be readily seen that tips 90 of corners 80 of the prior art are distinct from the smooth, arcuate corners 96 of die body 20. Thus, instead of forming sharp corner depressions 92 (see FIG. 5 of the prior art) smooth, arcuate corners 96 of die 20 form smooth arcuate depressions 98 in panel 22 (see FIG. 11) when die body 20 acts upon fastener 24 to fasten fastener 24 to panel 22 in the manner which has heretofore been described. Thus, the assembly as shown in FIG. 11 is superior to that of the prior art shown in FIG. 5 in that the arcuate depressions 98 in place of the prior art sharp depressions 92 makes the fastener/panel assembly of the present invention resistant to fracturing when subjected to high vibration environments. Grooves (exemplified at 100) are placed in die face 64 by grinding, or the like. The accomplish the grinding of groove 100, a grinding wheel having a cross-sectional contour which will create groove 100 (as shown in FIG. 12) is passed along face 64 of die body 20.

Now referring to FIG. 9, die body 20, much like its prior art counterpart, includes central passageway 25 defined by opposing side walls 56 and opposing end walls 55. Face 64 includes outwardly tapering or truncated outer walls 70 which taper off and form flat top (or end face) 68. Accordingly, face 68 blends with opening side walls 56 and outwardly tapering walls 70 to form clinching lips 60. Clinching lips 60 operate in an identical manner to that which has already been described in conjunction with the prior art, and accordingly, will not be discussed again.

Figure 12:
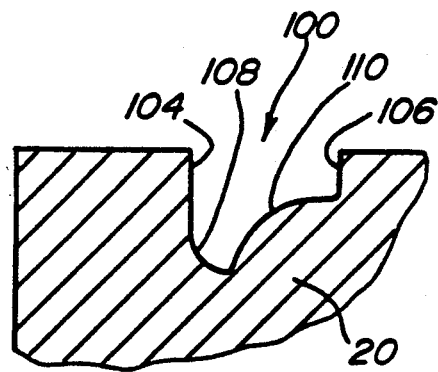
FIG. 12 is a cross-sectional view of the die member of the present invention taken substantially along lines 12—12 of FIG. 10.

Now referring to FIGS. 10 and 12, die body 20 includes grooves 100 which planar surface 102 of die body 20 to form arcuate corners 96. Specifically, as seen in FIG. 12, groove 100 is comprised of side walls 104, 106 and bottom walls 108, 110. Because bottom wall 110 has a generally convex contour, when bottom wall 110 intersects planar surface 102, the points along the line of intersection between these two surfaces create arcuate corners 96. It is these arcuate corners 96, when passed into panel 22, which give the fastener/panel assembly of the present invention its resistance against stress induced fracturing. This, of course, is a distinct advantage over the tips 94 of the die body of the prior art which are believed to be responsible for promoting stress induced fracturing of panel 22 in high vibration environments.

The foregoing detailed description shows that the preferred embodiment of the present invention is well suited to fulfill the objects of the invention. It is recognized, however, that various modifications may be made to the die member used to accomplish the fastener and panel assembly, herein disclosed without departing from the spirit of the invention. For example, the die member is preferably formed of tool steel to assure dimensional stability throughout multiple applications. The dimensions of the fastener and die assembly will depend upon the particular application. In a typical application, installing a fastener having a nominal pilot width of 0.368 inches, measured between side walls 51 of the fastener 24 and a nominal length of 0.447 inches, measured between end walls 30, 32 of fastener 24 require opening 26 of die body 20 to be 0.37 inches square. Thus, it can be seen, that side walls 51 of pilot 29 are closely received within die opening 26. Accordingly, it is to be understood that the subject matter sought to be afforded protection hereby should be deemed to extend to the subject matter defined in the appended claims, including all fair equivalents thereof.

I claim:

1. A method of joining a fastener to a metal panel using a die member, said fastener of a type having a generally rectangular pilot having a top face, said fastener further including a flange portion on opposed sides of said pilot, each said flange portion having bearing surfaces lying in a plane spaced from said pilot top face, each said flange portion further including a groove in said bearing surface, said die member having a die body having a generally rectangular opening adapted to receive said pilot portion of said fastener, said generally rectangular opening having generally arcuate corners, said die body opening surrounded by a generally planar surface having a generally rectangular outer perimeter having generally arcuate corners, said method including the steps of:

placing said panel between said fastener and said die body, driving said fastener pilot through a panel opening and engaging said pilot top face with said generally planar surface of said die body, driving said generally planar surface of said die into said panel thereby forming a depression in said panel conforming to said outer perimeter of said die, said depression having a generally rectangular perimeter having generally arcuate corners, whereby said arcuate corners of said depression are effective for resisting fracturing of said panel along said corners.

2. The method of claim 1, further including the step of plastically deforming, an end portion of said pilot thereby forming a panel bearing surface on said pilot, said panel being supported on said panel bearing surface.

3. A method of joining a fastener to a panel using a die member, said fastener of a type having an insertion face including a generally rectangular pilot having a top face, said top face bounded by at least two opposing end walls, said fastener further including a flange portion on opposed sides of said pilot, each said flange portion having bearing surfaces lying in a plane spaced apart from said pilot top face, each said flange portion further including a groove in said bearing surface, each said groove having an inner side wall, an outer side wall, and a bottom wall extending between said inner and outer side walls, said inner side walls being disposed proximate said pilot and said outer side walls being disposed distal said pilot, said die member of the type having a die body having a generally rectangular opening adapted to intimately engage said pilot portion of said fastener, said opening defined by at least two opposing end walls and two opposing side walls, said generally rectangular opening having generally arcuate corners, said opposed end walls being spaced apart such that the distance between said spaced apart end walls is less than the width of said fastener pilot between said two opposing end walls of said pilot, said die body opening being surrounded by a generally planar surface having a generally rectangular outer perimeter having generally arcuate corners, said die body further including clinching lips located along opposing sides of a generally rectangular opening, said clinching lips having a flat top portion and inner and outer side walls, said method including the steps of:

placing said panel between said fastener and said die body, passing said fastener insertion face through a panel opening and bringing said fastener insertion face into operative engagement with said generally planar surface surrounding said generally rectangular opening of said die body, deforming, using said opposing end walls of said die body, said arcuate corners of said die body rectangular opening, and said arcuate corners of said die body outer perimeter, an edge portion of said pilot near said pilot end walls thereby forming a panel bearing surface on said pilot, said panel bearing surface generally extending across the width of the fastener end walls and into an area at each end of said grooves, said panel being supported upon said pilot bearing surface in a sealed relationship thereto in conjunction with said panel being deformed into said grooves, thereby providing a continuous low pressure seal between said fastener and said panel.

4. The method of claim 3, wherein said edge portion of said fastener pilot is deformed generally parallel to the plane of said flange bearing surface.

* * * * *